(12) United States Patent
Alkhalifa

(10) Patent No.: US 9,898,544 B2
(45) Date of Patent: Feb. 20, 2018

(54) GUIDED WEB NAVIGATION TOOL

(71) Applicant: Eshaa Alkhalifa, West Riffa (BH)

(72) Inventor: Eshaa Alkhalifa, West Riffa (BH)

( * ) Notice: Subject to any disclaimer, the term of this patent is extended or adjusted under 35 U.S.C. 154(b) by 83 days.

(21) Appl. No.: 15/046,721

(22) Filed: Feb. 18, 2016

(65) Prior Publication Data

US 2017/0242828 A1    Aug. 24, 2017

(51) Int. Cl.
| | | |
|---|---|---|
| *G06F 17/22* | (2006.01) | |
| *G06F 17/30* | (2006.01) | |
| *G06F 3/0481* | (2013.01) | |
| *G06F 3/0482* | (2013.01) | |

(52) U.S. Cl.
CPC ........ *G06F 17/3089* (2013.01); *G06F 3/0482* (2013.01); *G06F 3/04817* (2013.01)

(58) Field of Classification Search
CPC .................................................. G06F 17/2235
USPC ......................................................... 715/205
See application file for complete search history.

(56) References Cited

U.S. PATENT DOCUMENTS

| | | | | |
|---|---|---|---|---|
| 2002/0002571 A1* | 1/2002 | Manohar | .......... | G06F 17/30873 715/273 |
| 2005/0027685 A1* | 2/2005 | Kamvar | ............ | G06F 17/30864 |
| 2006/0026191 A1* | 2/2006 | McSherry | ......... | G06F 17/30864 |
| 2009/0222435 A1* | 9/2009 | Andersen | .......... | G06F 17/30864 |

OTHER PUBLICATIONS

Hassan, Ahmed, and Ryen W. White. "Task tours: helping users tackle complex search tasks." Proceedings of the 21st ACM international conference on Information and knowledge management. ACM, 2012. (Year: 2012).*

Page, L., Brin, S., Motwani, R., & Winograd, T. (1999). The PageRank Citation Ranking: Bringing Order to the Web, 17pgs.

Haveliwala, T. H. (2003). Topic-Sensitive PageRank: A Context-Sensitive Ranking Algorithm for Web Search. Knowledge and Data Engineering, IEEE Transactions on, 15(4), 784-796.

Cho, J., Roy, S., & Adams, R. E. (2005). Page Quality: In Search of an Unbiased Web Ranking. In Proceedings of the 2005 ACM SIGMOD International Conference on Management of Data (pp. 551-562). ACM.

Agichtein, E., Brill, E., & Dumais, S. (2006). Improving Web Search Ranking by Incorporating User Behavior Information. In Proceedings of the 29th Annual International ACM SIGIR Conference on Research and Development in Information Retrieval (pp. 19-26). ACM.

* cited by examiner

*Primary Examiner* — Frank D Mills
(74) *Attorney, Agent, or Firm* — Duane Morris LLP

(57) ABSTRACT

Using a processor, a first N×N matrix is determined based on a plurality of N webpages. Each cell of the first matrix corresponds to a pair of webpages. The first matrix is transformed into a second N×N matrix with each cell being in one of N partitions, the values of the cells within each partition being substantially equal. A sequence of M webpages is determined based on the second matrix and keyword(s) inputted by a user. The sequence is arranged in order from a first webpage to an $M^{th}$ webpage (M<N), each of the webpages in the sequence being in the plurality of N webpages. A first host webpage, which is not in the plurality of N webpages, is generated including content from the first webpage in the sequence and a hyperlink to a second webpage in the sequence. The first host webpage is displayed at the electronic device.

18 Claims, 12 Drawing Sheets

$$\text{FIG. 3A} \quad \begin{array}{c} \text{To} \\ \begin{array}{c} \phantom{x} \\ \text{From} \end{array} \begin{array}{c} \phantom{x} \\ A \\ B \\ C \end{array} \begin{bmatrix} A & B & C \\ 0 & 1 & 1 \\ 0 & 1 & 0 \\ 1 & 0 & 1 \end{bmatrix} \end{array}$$

FIG. 3A $$\begin{array}{c} \text{To} \\ \begin{array}{c} A & B & C \end{array} \\ \text{From} \begin{array}{c} A \\ B \\ C \end{array} \begin{bmatrix} 0 & 0.7 & 0.7 \\ 0 & 0.7 & 0 \\ 0.7 & 0 & 0.7 \end{bmatrix} \end{array}$$

FIG. 3B $$\begin{array}{c} \text{To} \\ \begin{array}{c} A & B & C \end{array} \\ \text{From} \begin{array}{c} A \\ B \\ C \end{array} \begin{bmatrix} 0.033 & 0.733 & 0.733 \\ 0.033 & 0.733 & 0.033 \\ 0.733 & 0.033 & 0.733 \end{bmatrix} \end{array}$$

FIG. 3C $$\begin{array}{c} \text{To} \\ \begin{array}{c} A & B & C \end{array} \\ \text{From} \begin{array}{c} A \\ B \\ C \end{array} \begin{bmatrix} 0.022 & 0.489 & 0.917 \\ 0.041 & 0.489 & 0.022 \\ 0.489 & 0.041 & 0.489 \end{bmatrix} \end{array}$$

FIG. 3D $$\text{From} \begin{array}{c} A \\ B \\ C \end{array} \overset{\overset{\text{To}}{\begin{array}{ccc} A & B & C \end{array}}}{\begin{bmatrix} 0.260 & 0.251 & 0.507 \\ 0.451 & 0.042 & 0.251 \\ 0.498 & 0.042 & 0.698 \end{bmatrix}}$$

FIG. 6A $$\text{From} \begin{array}{c} A \\ B \\ C \end{array} \overset{\overset{\text{To}}{\begin{array}{ccc} A & B & C \end{array}}}{\begin{bmatrix} 0.261 & 0.303 & 0.589 \\ 0.263 & 0.188 & 0.146 \\ 0.551 & 0.148 & 0.551 \end{bmatrix}}$$

FIG. 6B $$\text{From} \begin{array}{c} A \\ B \\ C \end{array} \overset{\overset{\text{To}}{\begin{array}{ccc} A & B & C \end{array}}}{\begin{bmatrix} 0.285 & 0.285 & 0.556 \\ 0.286 & 0.157 & 0.159 \\ 0.556 & 0.157 & 0.558 \end{bmatrix}}$$

FIG. 6C $$\text{From} \begin{array}{c} A \\ B \\ C \end{array} \overset{\overset{\text{To}}{\begin{array}{ccc} A & B & C \end{array}}}{\begin{bmatrix} 0.285 & 0.285 & 0.557 \\ 0.285 & 0.158 & 0.158 \\ 0.557 & 0.158 & 0.557 \end{bmatrix}}$$

FIG. 6D

GUIDED WEB NAVIGATION TOOL

BACKGROUND

The Internet has had a profound effect on people's lives and on modern society in general. Starting as a limited network that linked a few universities in the late 1960s, a precursor to the modern Internet known as ARPANET initially offered email services and library lookup. The Internet later evolved to offer different kinds of services that support people in various facets of their lives. One aspect of the modern Internet, the World Wide Web ("the Web"), includes massive storage of digitally represented information and services including hyperlinked webpages that can be instantly shared between physically distant individuals. Typically, a user uses a computing device (e.g., desktop computer, notebook computer, smartphone, etc.) to run a web browser which enables her to request to view a particular webpage, e.g., entering an IP address or a Uniform Resource Locator (URL) or by following a hyperlink (also referred to as a link) from another webpage or program. The data for the requested webpage is retrieved from a web server and rendered at the web browser for display to the user. Companies, individuals, or other entities may have a website, which is a collection of webpages interconnected by hyperlinks. The experience of "visiting" websites without physically having to move (e.g., from the comfort of one's home) is unique to the Internet era.

With the advent of the Web, social networks, educational services, arts and even simple comments have become just a click away even for people in remote locations with little access to other modern services. But, a person still has to make that click, i.e., access the desired webpage, for the Web experience to be helpful. As discussed above, one way to access a webpage is to manually type in the URL, but that practice is becoming rare, particularly because of the likelihood of spelling errors and because it is difficult to know what the URL associated with specific content may be.

The sheer size of the Internet and Web led to the development of search engines, which aid people browsing the web in finding webpages that contain information that they desire or need. A surfer enters a search query, and the search engine generates and displays a list of addresses (Uniform Resource Locators URLs) and/or hyperlinks to those addresses. The results (hits) generated by a search engine are typically displayed in style reminiscent of traditional phone directories, with many pages each containing a number of search hits.

Referring to FIG. 1, a typical user experience regarding search results is as follows. A web browser displays a search engine's results page 110, and the surfer clicks (or pressing, or otherwise selecting) one of the search results in the list, e.g., webpage 120-1. The surfer may review webpage 120-1 for desired goals (i.e., whether the page contains the information that the surfer desired to find through the search process), and if the surfer is not satisfied, she returns to the static search results page 110 to review other search hits. In this manner, the surfer may visit webpages 120-2, 120-3, and 120-4 in turn, each time returning to results page 110 before trying another search result. In this way, a surfer may spend most of the time reviewing the search engine's page 110. Such a search experience can be laborious and frustrating from the surfer's perspective, particularly because the search engine may have returned many pages of search results. Although the hits displayed at results page 110 may be ranked in some order by a search algorithm, the surfer still has to cull through the hits to determine which, if any, webpages she will visit, and to determine an order in which to visit them.

SUMMARY

In some embodiments of the present disclosure, a method for guided website navigation involves determining, using a processor of an electronic device, a first matrix that includes cells arranged in N rows and N columns based on a plurality of N webpages (where N is an integer). Each cell of the first matrix corresponds to a pair of webpages among the plurality of webpages. Using the processor, the first matrix is transformed into a second matrix including cells arranged in N rows and N columns. Each cell of the second matrix is in one of N partitions, wherein the values of the cells within each partition are substantially equal to one another, e.g., within a predetermined tolerance. Using the processor, a sequence of M webpages is determined based on the second matrix and one or more keywords inputted by a user. The sequence is arranged in order from a first webpage to an $M^{th}$ webpage (where M is an integer less than N), and each of the webpages in the sequence is in the plurality of N webpages. Using the processor, a first host webpage is generated including content from the first webpage in the sequence and a hyperlink to a second webpage in the sequence. The first host webpage is not in the plurality of N webpages, and the second webpage in the sequence succeeds the first webpage in the sequence. The first host webpage is displayed at the electronic device.

In some embodiments, a method for guided website navigation involves retrieving from a memory of an electronic device a matrix including cells arranged in N rows and N columns is retrieved. The matrix includes diagonal cells associated with respective webpages. One or more input keywords is/are received from a user. Using a processor of the electronic device, the one or more input keywords is/are mapped to a plurality of M webpages, where M is an integer. Using the processor, the plurality of M webpages are arranged in order to generate a sequence of the M webpages. The sequence is arranged from a first webpage to an $M^{th}$ webpage based on respective magnitudes of the values of the diagonal cells associated with the M webpages. Using the processor, a first host webpage is generated including content from the first webpage in the sequence and a hyperlink to a next webpage in the sequence. The first host webpage is displayed at the electronic device.

In some embodiments, a non-transitory machine readable storage medium has instructions stored thereon, the instructions when executed by a processor of an electronic device causing the processor to perform the operations of one or more of the above-described methods for guided website navigation.

BRIEF DESCRIPTION OF THE DRAWINGS

The following will be apparent from elements of the figures, which are provided for illustrative purposes and are not necessarily to scale.

FIG. 3A shows of an adjacency matrix in accordance with some embodiments.

FIG. 3B shows the result of a dampening operation applied to an adjacency matrix in accordance with some embodiments.

FIG. 3C shows the result of distributing an amount of reduction associated with dampening across the cells of a matrix and adding that amount of reduction to each cell, in accordance with some embodiments.

FIG. 3D shows the result of normalizing cycles in a matrix by their corresponding cycle sums, in accordance with some embodiments.

FIGS. 6A-6D show the result of various iterations of an update procedure performed to an accessibility matrix in accordance with some embodiments (6A: end of first iteration; 6B: end of second iteration; 6C: end of third iteration; 6D: end of fourth iteration)).

DETAILED DESCRIPTION

This description of the exemplary embodiments is intended to be read in connection with the accompanying drawings, which are to be considered part of the entire written description.

The foregoing deficiencies (and others) of traditional Web navigation are addressed by various embodiments of the present disclosure. Instead of a situation where a surfer has to manually enter an address (e.g., IP address or URL) of a webpage or spend significant time on a search results' results page to explore various hits, the navigation experience becomes nearly effortless in some embodiments. The navigation experience becomes more akin to a travel agent or travel guide providing a surfer with a carefully curated travel itinerary based on the surfer's stated desires. In some embodiments, the user enters her search term(s) and then is guided along the traversal of various webpages in sequence. Unlike merely visiting search hits returned by a search engine one after the other, in various embodiments the generated itinerary is based on a flow measure that indicates which webpages are likely to have more visitors than others and thus are more likely to meet surfers' needs or desires. In particular, some embodiments compute a measure of how difficult it is to arrive at a webpage based on incoming hyperlinks and how long people are likely to stay there. An overview of guided web navigation is provided below, followed by details of the itinerary generation process.

Figure 1:
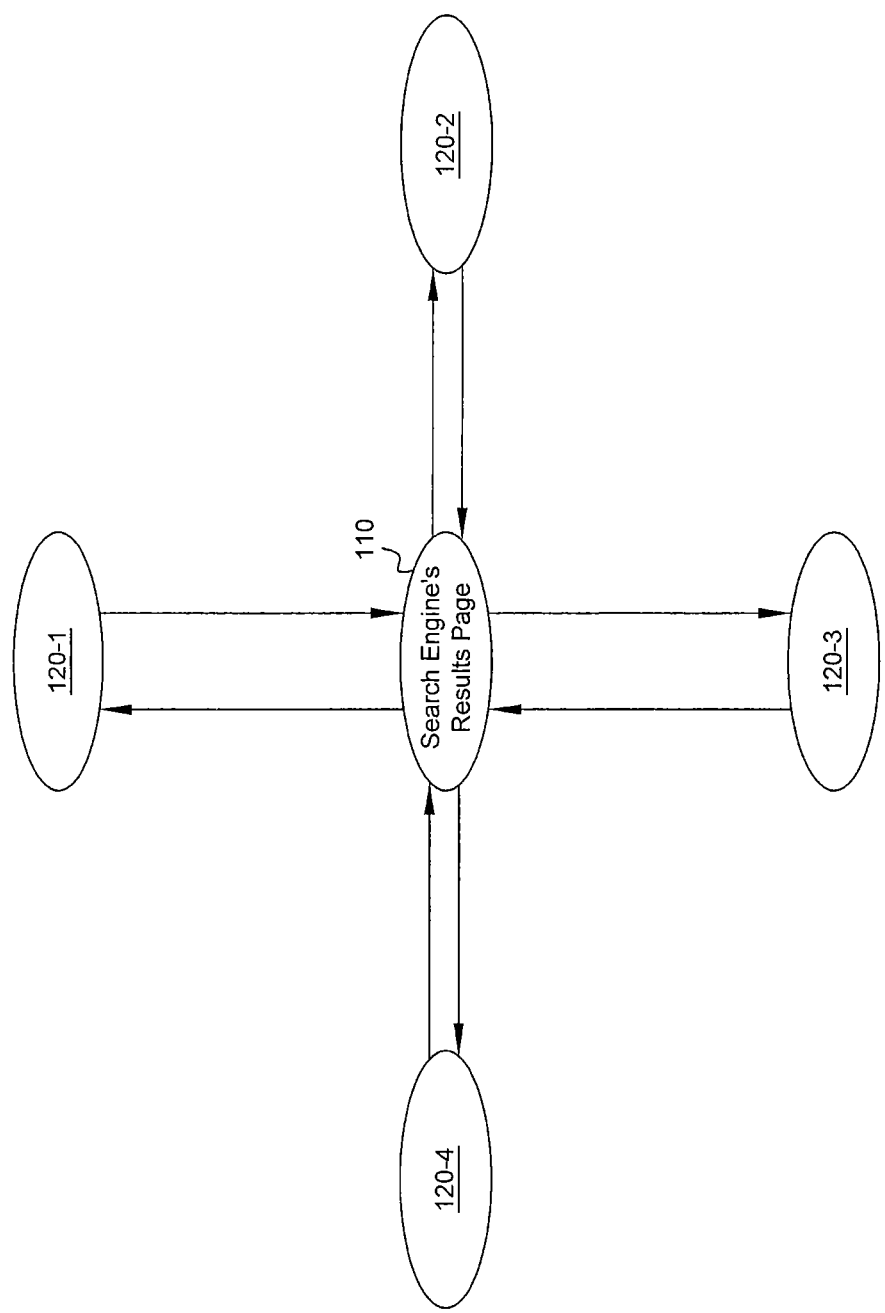
FIG. 1 is a diagram illustrating a typical user experience regarding search results.
Figure 2:
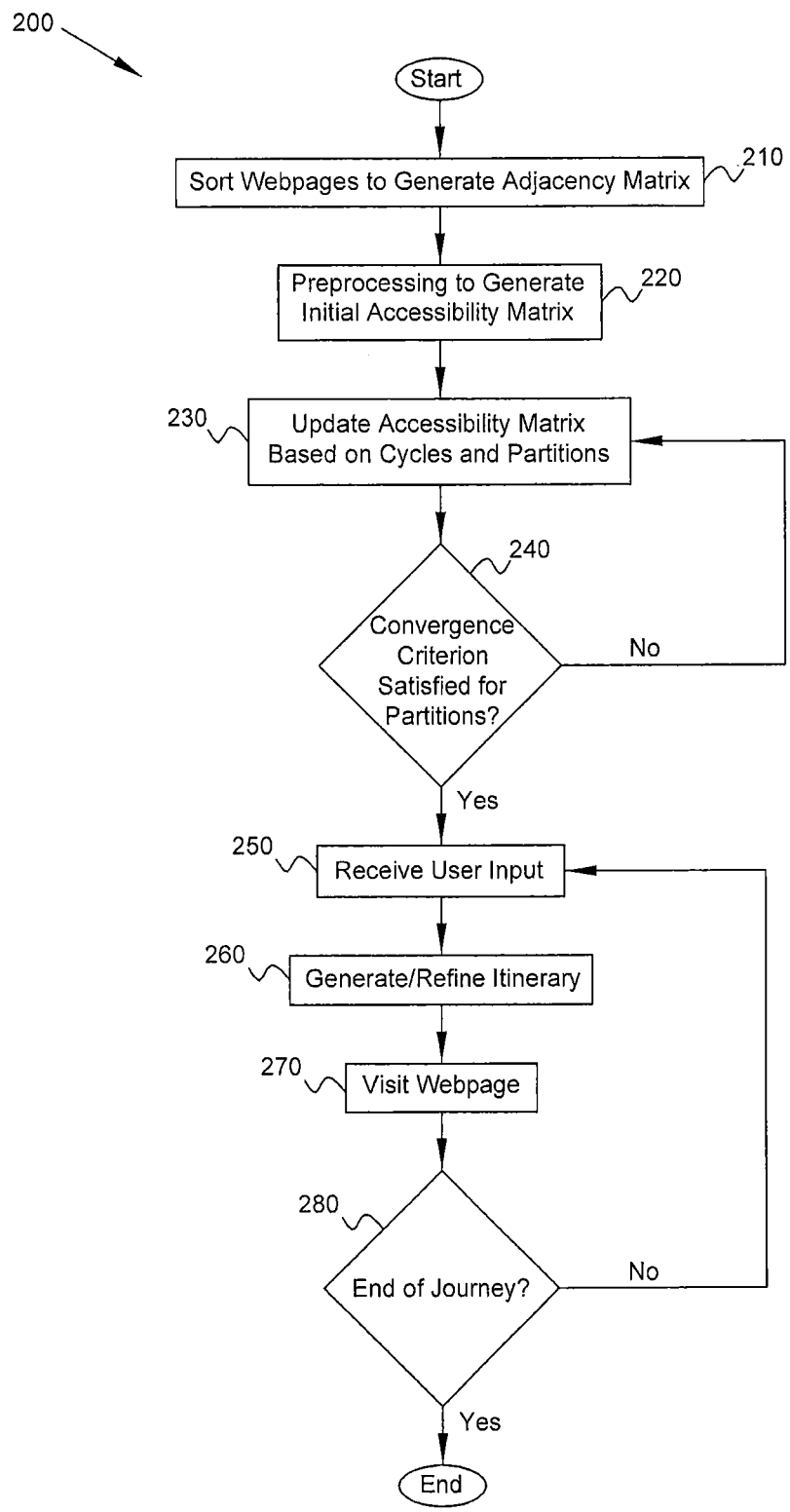
FIG. 2 is a flow diagram of a guided web navigation process in accordance with some embodiments of the present disclosure.

FIG. 2 is a flow diagram of a guided web navigation process in accordance with some embodiments. Initially, a set S of webpages is sorted according to a predetermined sorting criterion. Set S may be any set of webpages, e.g., a small-scale set for a particular organization's network or a large-scale set of webpages for as much of the Web as desired to be handled. For ease of description, a three-element set S containing webpages A, B, and C is described below. The principles and processing details disclosed regarding this small example set are applicable to much larger sets of webpages. In some embodiments, the predetermined sorting criterion enables sorting the webpages in order of increasing (or decreasing) number of incoming or outgoing links. Either incoming or outgoing links could be the basis for sorting in ascending order (for example) because they both pertain to flow of web traffic.

As one example, suppose webpage A contains a link to webpages B and C; webpage B contains a link only to itself (webpages can include links to themselves), and webpage C contains a link to webpages A and C. In that case, webpage A has one incoming link (i.e., from webpage C); webpage B has two incoming links (i.e., from webpages A and B); and webpage C has two incoming links (i.e., from webpages A and C. Sorting by increasing number of incoming links yields the order <A, B, C> (assuming the tie between B and C is broken in favor of B either randomly or through a predetermined tiebreaking mechanism).

The sorted webpages are used to construct a adjacency matrix MADJ (block 210), which has rows and columns ordered according to the sort order and which may be written as:

$$MADJ=[0,1,1;0,1,0;1,0,1]$$

In the above representation, ';' denotes a row delimiter and ',' denotes a column delimiter. The binary value at each cell $a_1$ of MADJ is 1 if there is a link from the webpage corresponding to row i to the webpage corresponding to column j, and is 0 otherwise. For convenience, the cell notation $a_{ij}$ is used throughout this disclosure and may refer to various cells in various matrices in various contexts. It is well known that matrices may be used to represent a graph (such as a graph of interconnected webpages), but in various embodiments of the present disclosure certain previously-unexplored matrices pertaining to a graph of webpages are processed in ways that have not been done before, and to enable a new technique for using the Web.

At block 220, preprocessing is performed based on the adjacency matrix, to generate an initial accessibility matrix. At block 230, the accessibility matrix is updated iteratively based on cycles and partitions of the accessibility matrix (cycles and partitions are described further below). A convergence criterion (termination condition for the iterative loop) is checked after each iteration (block 240). After the accessibility matrix has converged, the converged accessibility matrix is used to guide the user along a selected sequence of webpages. The user provides input (block 250) that is used to generate an itinerary (block 260). The generated itinerary, which is an ordered list of webpages to be visited, is tailored to the user's preferences and relieves the user of the burden of having to determine manually (as with traditional search approaches) which search hits to try and in which order.

At block 270, the web browser of the user renders the first webpage in the itinerary and displays it to the user, so that the first webpage is visited. The process loops back to block 250, where additional user input may be received, which may include a request to proceed to the next webpage in the itinerary, a request to revise settings associated with the guided navigation, or other feedback. The itinerary may be refined (block 260), and the next webpage in the itinerary may be visited. If the end of the journey has not yet been reached (block 280), the process loops back to block 250 again and continues as shown in FIG. 2. Additional details regarding various aspects of FIG. 2 are described in greater detail further below.

Figure 4:
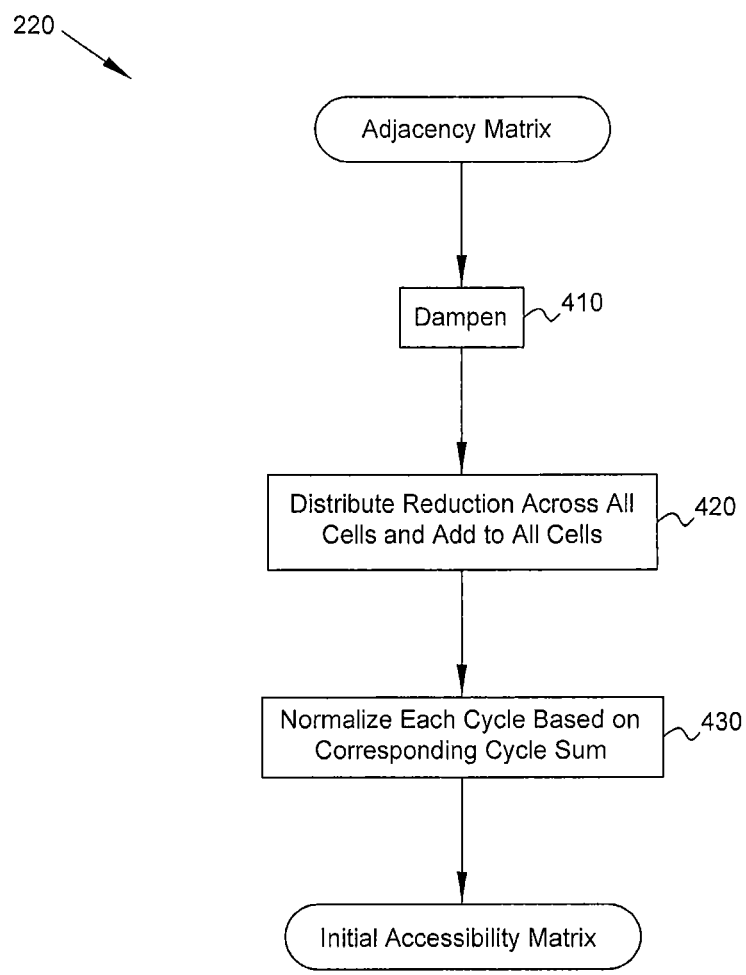
FIG. 4 is a flow diagram of preprocessing operations for generating an initial accessibility matrix from an adjacency matrix, in accordance with some embodiments.

Referring to FIG. 4, details regarding the preprocessing (block 220) are now provided. The adjacency matrix shown in FIG. 3A is preprocessed to facilitate subsequent numerical operations and to transform the information into a viable map for the purpose of generating a useful itinerary. A dampening operation (block 410) includes multiplying the initial accessibility matrix MADJ by a dampening factor $\alpha$ which in some embodiments is a real number between 0 and 1. For example, with $\alpha=0.7$ the matrix after dampening is:

MADJ1=[0,0.7,0.7;0,0.7,0;0.7,0,0.7]

This result is shown in FIG. 3B.

The dampening thus induces a reduction in the matrix MADJ. The amount of reduction $1-\alpha$ is then distributed across all the cells and added to each cell (block 420). In other words, $(1-\alpha)/N^2$ is added to matrix MADJ1, where N is the number of elements in set S (such that $N^2$ is the number of cells in matrix MADJ1), to yield:

MADJ2=[0.033,0.733,0.733;0.033,0.733,0.033;0.733, 0.033,0.733]

In the above expression, cell values are rounded to three decimal places. In all the examples described herein, rounding to a small number of decimal places is used for ease of explanation, and it is understood that greater numerical precision may be used in actual implementations.

This result is shown in FIG. 3C.

As a result of the preprocessing blocks 410 and 420, zeros in the matrix are eliminated, so that subsequent processing operations (e.g., multiplications) will not yield degenerate results.

Figure 5C:
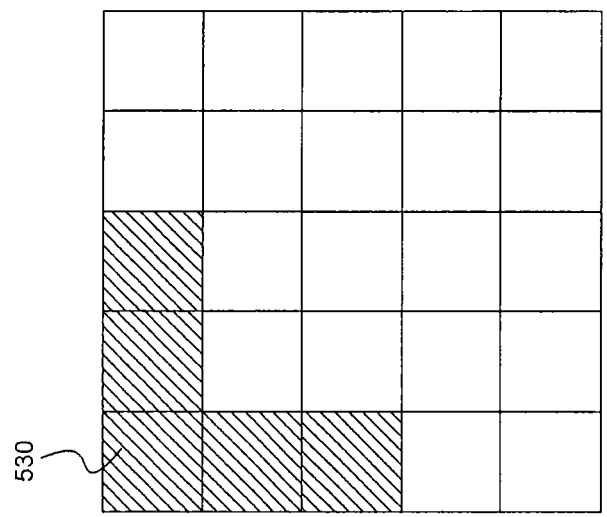
FIGS. 5A-5C show, with diagonal striping, elements of respective cycles of matrices (5A: N=3; 5B: N=4; 5C: N=5).

At block 430, each cycle of matrix MADJ2 is normalized by a corresponding cycle sum. Cycles may be understood with reference to FIGS. 5A-5C. Referring to FIG. 5A, for a square matrix having dimensions N×N where N is odd (here, N=3), the first ceiling(N/2) cells in the topmost row and the first ceiling(N/2) cells in the leftmost column form region 510 shown with diagonal striping, where ceiling(x) refers to the smallest integer not less than x. A cycle is associated with each cell in region 510 as follows. The cell at row 1, column 1 is the first element in the first cycle. The remaining elements in the first cycle are determined by iteratively incrementing the row and column index by one and "wrapping around" to the first row or column if the row or column index would exceed the row or column bounds (i.e., would exceed N) as a result of such incrementing. Thus, the row and column indices for the first cycle are as follows: <(1,1), (2,2), (3,3)>. Incrementing the row and column indices after (3,3) would yield (4,4), which wraps around to (1,1) to avoid exceeding the row and column bounds, thus showing the cyclical property.

The first element of the second cycle is determined by incrementing by one the row index of the first element of the first cycle, to yield the cell at row 2, column 1. The remaining elements in the second cycle are determined in the same manner as described above—increment row and column indices to yield (3,2), and then increment row and column indices again (with wrap-around to row 1 because the row index would otherwise be 4) to yield (1,3). In other words, the row and column indices for the second cycle are as follows: <(2,1), (3,2), (1,3)>.

The first element of the third cycle is determined by incrementing by one the column index of the first element of the first cycle, to yield the cell at row 1, column 2. The remaining elements in the third cycle are determined in the same manner as described above—increment row and column indices to yield (2,3), and then increment row and column indices again (with wrap-around to column 1 because the column index would otherwise be 4) to yield (3,1). In other words, the row and column indices for the third cycle are as follows: <(1,2), (2,3), (3,1)>.

Thus, each square matrix of dimensions N×N has N cycles each containing N elements. The above-described three cycles are all the cycles of the 3×3 matrix shown in FIG. 3A. These cycles may be referred to as Hamiltonian cycles because each cycle visits each webpage exactly once.

For the case where N is even (see FIG. 5B where N=4), the cycles are determined in a similar manner as described above except that region 520 (shown in FIG. 5B with diagonal striping) is an L-shaped region instead of a symmetrical region, to preserve the property that each cycle has N elements. In other words, the first N/2+1 cells in the first row and the first N/2 cells in the first column form region 520 in some embodiments. In other embodiments, the first N/2 cells in the first row and the first N/2+1 cells in the first column may be used instead, i.e., there are two possible orientations for the L-shaped region.

Figure 5B:
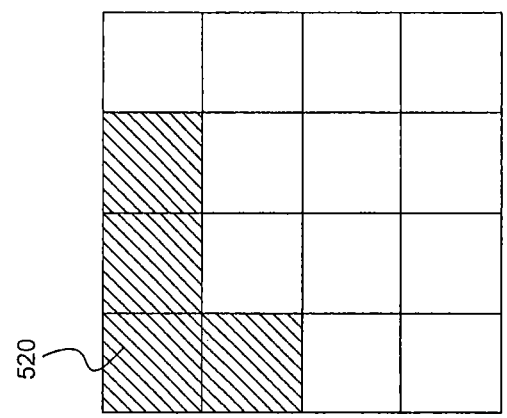
Figure 5A:
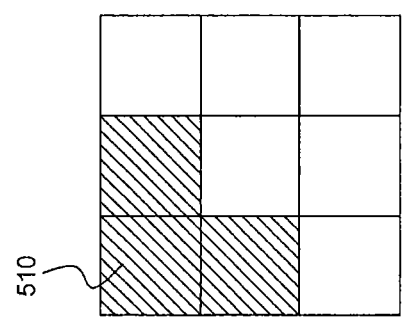

The cycles for the matrix shown in FIG. 5B are as follows:
Row and column indices of cells in the first cycle are <(1,1), (2,2), (3,3), (4,4)>.
Row and column indices of cells in the second cycle are <(2,1), (3,2), (4,3), (1,4)>.
Row and column indices of cells in the third cycle are <(1,2), (2,3), (3,4), (4,1)>.
Row and column indices of cells in the fourth cycle are <(1,3), (2,4), (3,1), (4,2)>.

As another example where N is odd, consider FIG. 5C where N=5. Ceiling(5/2)=ceiling(2.5)=3, so region 530 includes the first 3 cells in the first row and first column. The cycles for the matrix shown in FIG. 5C are as follows:
Row and column indices of cells in the first cycle are <(1,1), (2,2), (3,3), (4,4), (5,5)>.
Row and column indices of cells in the second cycle are <(2,1), (3,2), (4,3), (5,4), (1,5)>.
Row and column indices of cells in the third cycle are <(1,2), (2,3), (3,4), (4,5),
Row and column indices of cells in the fourth cycle are <(3,1), (4,2), (5,3), (1,4), (2,5)>.
Row and column indices of cells in the fifth cycle are <(1,3), (2,4), (3,5), (4,1), (5,2)>.

Thus, in general, for N odd, the respective cycles are ordered based on a traversal of the respective striped regions (510 in FIG. 5A, or 530 in FIG. 5C, for example) in this order of row and column indices: <(1,1), (2,1), (1,2), (3,1), (1,3), ... >until N such cells are identified. In general, for N even, the traversal of the respective striped regions (520 in FIG. 5B, for example) proceeds in similar manner except that one additional cell is included in either the first row or first column to yield the L-shape as described above.

Referring back to FIG. 4, at block 430 the three cycles (for the above example where N=3) of matrix MADJ2 are normalized by their corresponding cycle sums as follows:

First cycle: cycle sum=0.033+0.733+0.733=1.499. The cells in the first cycle (i.e., cells at row and column indices (1,1), (2,2), (3,3)) are each divided by 1.499.

Second cycle: cycle sum=0.033+0.033+0.733=0.799. The cells in the second cycle (i.e., cells at row and column indices (2,1), (3,2), (1,3)) are each divided by 0.799.

Third cycle: cycle sum=0.733+0.033+0.733=1.499. The cells in the third cycle (i.e., cells at row and column indices (1,2), (2,3), (3,1)) are each divided by 1.499.

The result of this normalization is the initial accessibility matrix ACC:

ACC=[0.022,0.489,0.917;0.041,0.489,0.022;0.489, 0.041,0.489]

This result is shown in FIG. 3D.

Details of iteratively updating the accessibility matrix are now provided. As described above, the N cycles in an N×N matrix are mutually disjoint and collectively include all $N^2$ cells of the matrix. Therefore, each cell is associated with a distinct cycle. At block 230, the initial accessibility matrix ACC is updated by updating each cell $a_{ij}$ to be the dot product of the cycle containing cell $a_{ij}$ with the partition containing cell $a_{ij}$. Partitions may be understood with reference to FIGS. 5A-5C. In each of FIGS. 5A, 5B, and 5C, the diagonal striped region (510, 520, or 530) is the first partition of the N×N matrix. Thus, the first partition for the example in FIG. 5A consists of cells $a_{11}$, $a_{21}$, $a_{12}$. In general, the elements of the $(k+1)^{th}$ partition (where k 1, . . . , N−1) are determined by incrementing by one the row and column indices of the $k^{th}$ partition and wrapping around to the first row or column if needed to avoid exceeding row or column bounds. Thus, the second partition consists of cells $a_{22}$, $a_{32}$, $a_{23}$ and the third partition consists of cells $a_{33}$, $a_{13}$, $a_{31}$. For the example in FIG. 5B, the first partition consists of cells $a_{11}$, $a_{21}$, $a_{12}$, $a_{13}$; the second partition consists of cells $a_{22}$, $a_{32}$, $a_{23}$, $a_{24}$; the third partition consists of cells $a_{33}$, $a_{43}$, $a_{34}$, $a_{31}$; and the fourth partition consists of cells $a_{44}$, $a_{14}$, $a_{41}$, $a_{42}$. It is observed that an ordering is imposed on the cycles and on the partitions, so that the cycles and partitions are each ordered lists (vectors), and thus the dot product of a cycle with a partition is meaningful. A dot product under these conditions will weigh options of travel at set durations and starting locations. So to estimate the popularity of a location such as a park for example, one considers the number of individuals going in through available roads as well as those on roads leading out. A partition therefore represents the immediate neighborhood of the park while a cycle represents the ring road that leads to this park as well as other places. A dot product therefore breaks the neighborhood into parts and pairs them with the traffic congestion on parts of the ring road to compute an estimate of popularity for that park.

Thus, the updating of initial accessibility matrix ACC may be performed as follows.

Elements of first cycle are updated as follows:

$a_{11}$=dot product((cycle containing $a_{11}$), (partition containing $a_{11}$))=dot product($<a_{11},a_{22},a_{33}>$, $<a_{11},a_{21},a_{12}>$)=(0.022)(0.022)+(0.489)(0.041)+ (0.489)(0.489)=0.00048+0.020+0.239=0.260

$a_{22}$=dot product((cycle containing $a_{22}$), (partition containing $a_{22}$))=dot product($<a_{11},a_{22},a_{33}>$, $<a_{22},a_{32},a_{23}>$)=(0.022)(0.489)+(0.489)(0.041)+ (0.489)(0.022)=0.011+0.020+0.011=0.042

$a_{33}$=dot product((cycle containing $a_{33}$), (partition containing $a_{33}$))=dot product($<a_{11},a_{22},a_{33}>$, $<a_{33},a_{13},a_{31}>$)=(0.022)(0.489)+(0.489)(0.917)+ (0.489)(0.489)=0.011+0.449+0.239=0.698

The new values for these cells add up to one, i.e., $a_{11}+a_{22}+a_{33}$=0.260+0.042+0.698=1.

Elements of second cycle are updated as follows:

$a_{21}$=dot product((cycle containing $a_{21}$), (partition containing $a_{21}$))=dot product($<a_{21},a_{32},a_{13}>$, $<a_{11},a_{21},a_{12}>$)=(0.041)(0.022)+(0.041)(0.041)+ (0.917),(0.489)=0.001+0.002+0.449=0.451

$a_{32}$=dot product((cycle containing $a_{32}$), (partition containing $a_{32}$))=dot product($<a_{21},a_{32},a_{13}>$, $<a_{22},a_{32},a_{23}>$)=(0.041)(0.489)+(0.041)(0.041)+ (0.917)(0.022)=0.020+0.002+0.020=0.042

$a_{13}$=dot product((cycle containing $a_{13}$), (partition containing $a_{13}$))=dot product($<a_{21},a_{32},a_{13}>$, $<a_{33},a_{13},a_{31}>$)=(0.041)(0.489)+(0.041)(0.917)+ (0.917)(0.489)=0.020+0.038+0.449=0.507

The new values for these cells add up to one, i.e., $a_{21}+a_{32}+a_{13}$=0.451+0.042+0.507=1.

Elements of third cycle are updated as follows:

$a_{12}$=dot product((cycle containing $a_{12}$), (partition containing $a_{12}$))=dot product($<a_{12},a_{23},a_{31}>$, $<a_{11},a_{21},a_{12}>$)=(0.489)(0.022)+(0.022)(0.041)+ (0.489)(0.489)=0.011+0.001+0.239=0.251

$a_{23}$=dot product((cycle containing $a_{23}$), (partition containing $a_{23}$))=dot product($<a_{12},a_{23},a_{31}>$, $<a_{22},a_{32},a_{23}>$)=(0.489)(0.489)+(0.022)(0.041)+ (0.489)(0.022)=0.239+0.001+0.011=0.251

$a_{31}$=dot product((cycle containing $a_{31}$), (partition containing $a_{31}$))=dot product($<a_{12},a_{23},a_{31}>$, $<a_{33},a_{13},a_{31}>$)=(0.489)(0.489)+(0.022)(0.041)+ (0.489)(0.489)=0.239+0.020+0.239=0.498

The new values for these cells add up to one, i.e., $a_{12}+a_{23}+a_{31}$=0.251+0.251+0.498=1.

Hence, the result of the first iteration of the update to the accessibility matrix is: [0.260, 0.251, 0.507; 0.451, 0.042, 0:251; 0.498, 0.042, 0.698].

This result is shown in FIG. 6A.

At block 240, a convergence criterion is checked for the partitions of the accessibility matrix. If the elements within each partition are substantially identical to one another (e.g., within a predetermined distance of one another), then this convergence criterion is satisfied, and the loop will be terminated; otherwise, another iteration of the loop is performed. Suppose the convergence criterion is that each partition must contain elements that agree to three decimal places with other all elements of the partition. After the first iteration of the update procedure, the first partition contains $<a_{11}$=0.260, $a_{21}$=0.451, $a_{12}$=0.251>. The convergence criterion is not met after the first iteration of the update, so another iteration of the update (block 230) is performed, yielding this updated accessibility matrix: [0.261, 0.303, 0.589; 0.263, 0.188, 0.146; 0.551, 0.148, 0.551].

This result is shown in FIG. 6B.

The convergence criterion (loop termination condition) still is not satisfied, so another iteration of the update is performed, resulting in this updated accessibility matrix: [0.285, 0.285, 0.556; 0.286, 0.157, 0.159; 0.556, 0.157, 0.558].

This result is shown in FIG. 6C.

The convergence criterion (loop termination condition) still is not satisfied, so another iteration of the update is performed, resulting in this updated accessibility matrix: ACCFINAL=[0.285, 0.285, 0.557; 0.285, 0.158, 0.158; 0.557, 0.158, 0.557].

This result is shown in FIG. 6D.

The first partition of this matrix consists of the cells $<a_{11}$=0.285, $a_{21}$=0.285, $a_{12}$=285> which agree with each other to three decimal places. Similarly, the second partition of the matrix consists of cells $<a_{22}$=0.158, $a_{32}$=0.158, $a_{23}$=0.158> which agree with each other to three decimal places, and the third partition consists of cells $<a_{33}$=0.557, $a_{13}$=0.557, $a_{31}$=0.557> which agree with each other to three decimal places. Hence, the accessibility matrix has converged, and the update loop is terminated. If additional iterations of the updating were to be performed, the accessibility matrix would remain unchanged (within the tolerance corresponding to the convergence criterion). The converted accessibility matrix ACCFINAL shows, for each webpage, the value associated with the likelihood of remaining stationary at the webpage (i.e., the diagonal entry corresponding to that webpage) versus the likelihood of advancing to about half of the remaining webpages, because about half of the remaining webpages are in the same partition. This half may be called the first half of the graph for contrasting with the second half described further below.

For example, consider for the N=3 case the values $a_1$, $a_{22}$, and $a_{33}$, where a user is likely to remain stationary because those cells represent a transition from a webpage to itself. The values at those cells can be associated with how popular those webpages are relative to each other considering the ease of arriving at those webpages and the low temptation of leaving them. If a webpage has many incoming links, it is likely to have a high value. If, on the other hand, the webpage has many outgoing links, it is somewhat like a bus station where many people pass through but do not remain for long.

With the non-diagonal cells that are not in the same partition as a given diagonal cell, the converged accessibility matrix also associates a value with a transition from the webpage corresponding to the given diagonal cell to each of the webpages in the second half of the graph. Thus, the graph is essentially divided, from the perspective of each webpage, into two parts—a neighborhood of that webpage, and other webpages. The information in the converged accessibility matrix ACCFINAL can be used to select a sequence of webpages for visitation that maximizes the likelihood that those webpages are "worth visiting" based on incoming/outgoing links and traffic flow analysis. This link analysis does not depend on how many people actually visited the various webpages in set S in the past, but rather is based on the topological structure itself of the graph of webpages.

The converged accessibility matrix ACCFINAL may be interpreted as a map of reachability of webpages that is balanced based on flow to websites according to incoming links and outgoing links. Webpage C corresponds to diagonal cell a33=0.557 which is the highest magnitude diagonal value in ACCFINAL, so webpage C is the most likely to have surfers visit it and remain there (not just visit it). Webpage B corresponds to diagonal cell a22=0.158 which is the lowest magnitude diagonal value, so webpage B is the least likely resting spot for visitors.

Thus, the webpages in the set {A, B, C} may be sorted according to decreasing order of the magnitudes of their corresponding diagonal cells in accessibility matrix ACCFINAL, to yield the order <C, A, B>. An itinerary that is carefully designed based on these considerations can maximize the chance that visitors will want to rest at each stop along the itinerary, i.e., spend substantial time on each webpage in the itinerary. Increased visitation time at a given webpage typically corresponds to increased advertising revenue and other commercial benefits for the proprietor of the webpage, i.e., a tangible effect in the real world.

Figure 7:
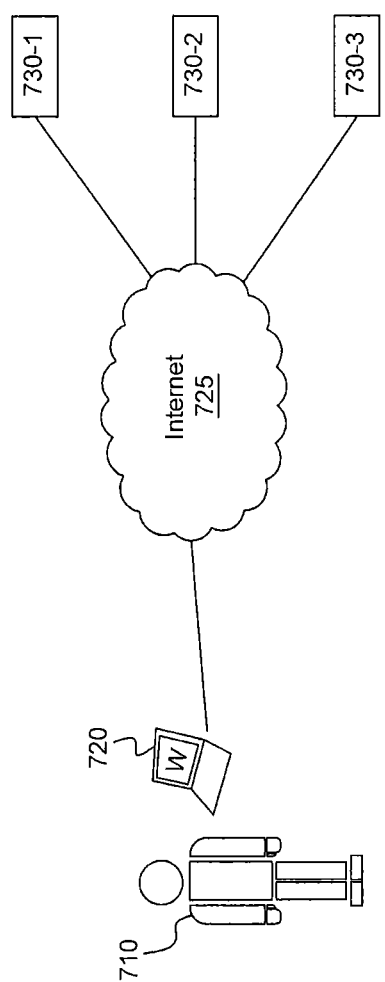
FIG. 7 is an diagram of an example guided tour of various webpages in accordance with some embodiments.
Figure 9:
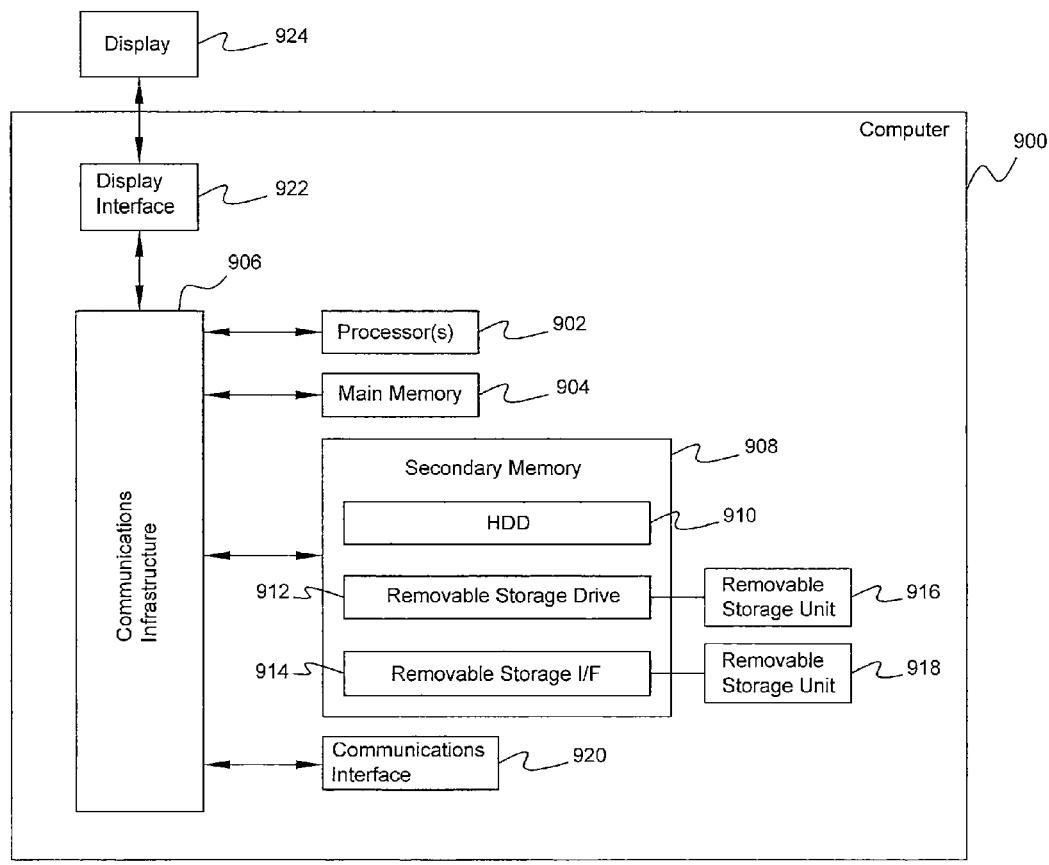
FIG. 9 is a diagram of a computer system which may be used in some embodiments.

Referring to FIG. 7, in some embodiments, a website W that can be accessed by a user 710 using a computing device 720 provides a service that guides the user along a tour of various webpages based on accessibility matrix ACCFINAL and other data (described below). The various webpages that constitute the stops along the web tour are retrieved from web servers 730-1, 730-2, 730-3, etc. via Internet 725 or another network. Three web servers are shown in FIG. 7, but any number of web servers may be accessed. Computing device 720 may be any computing device with a network interface, e.g., a desktop computer, notebook computer, smartphone, other handheld computing device, etc. An example implementation of computing device 720 is shown in FIG. 9 (described further below). Accessibility matrix ACCFINAL is stored in a memory at computing device 720 or another computer accessible by computing device 720 (e.g., cloud storage is possible).

Figure 8:
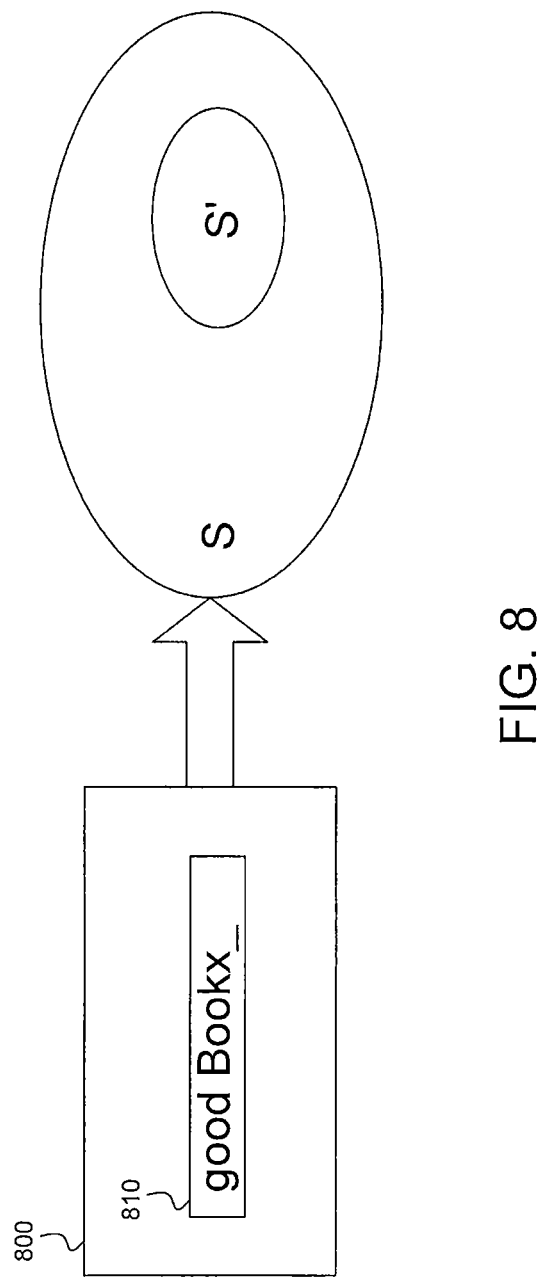
FIG. 8 is a diagram showing an example GUI and a narrowing of a set of webpages based on keywords inputted using the GUI, in accordance with some embodiments.

Initially, the user visits website W using a web browser running on computing device 720. Referring back to FIG. 2, the user is prompted for input (block 250), e.g., with a field 810 in a graphical user interface (GUI) 800 (shown in FIG. 8) that allows the user to enter or select keyword(s) or topics of interest to the user. The user may enter "good Bookx", for example. Based on the user input, a subset S' of the set S of webpages is determined. For example, set S may contain millions of webpages corresponding to respective rows and columns of accessibility matrix ACCFINAL, and set S' may be a smaller set of, e.g., hundreds or thousands of webpages that match the user input. In some embodiments, the webpages in set S' contain in their text all of the keywords inputted by the user, e.g., "good" and also "Bookx." Various Boolean connectors (e.g., "or", "and", "not") may be supported for the user inputted keywords, and the webpages in set S' may meet such Boolean-based conditions.

In some embodiments, a synonym/antonym feature enables the user to view webpages that contain text having a predetermined semantic relationship to the user inputted keyword(s). Synonyms and antonyms here do not have to be precisely the same in meaning, or opposite in meaning, in a linguistic sense. Rather, a first list (synonyms) stored in memory at computing device 720 or a computer accessible by computing device 720 maps words or other text strings to words or text strings that are considered to be synonyms in a broad sense, and a second list (antonyms) stored in memory at computing device 720 or a computer accessible by computing device 720 maps words or other text strings to words or text strings that are that are considered to be antonyms in a broad sense. Using such synonym/antonym functionality, the user inputted keywords can be used to derive a broader set of matching webpages for the guided tour. User-modifiable settings are available for only synonyms, only antonyms, or both synonyms and antonyms may be available at website W. Suppose both synonyms and antonyms are activated. Based on the user's input "good Bookx," the words "interesting", "satisfactory" and excellent" may be identified as synonyms and the words "boring", "unsatisfactory" and "poor" may be identified as antonyms. The same number of synonyms may be identified as antonyms, or a different number may be identified. Using the synonym/antonym feature, webpages that contain the text "Bookx" and any of {"good", any synonym of "good", any antonym of "good"} may be selected for set S'.

Additional user input may be obtained at block 250 as well. For example, the user may be prompted by a query such as "Are you interested in directory sites or content sites?" Webpages with a relatively large number of outgoing links (e.g., greater than a predetermined number of links) may be considered to be "directory" sites, and webpages with a relatively small number of outgoing links (e.g., smaller than a predetermined number of links) may be considered to be "content" sites. The predetermined number for the directory/content classification may be the average number of outgoing links for all webpages in set S. The webpages that match the user inputted keywords (with or without synonym/antonym functionality) may be pruned based on the directory/content classification. For example, by providing the ability to select only content sites, for example, the user may be spared the aggravation of visiting webpages that are automatically created by content aggregators (typically for spamming/marketing purposes), as such webpages typically are mere collections of links to other webpages and do not offer much in the way of useful content (apart from links) themselves.

In some embodiments, sentiment analysis is used to provide additional filtering options. Webpages may be classified as "positive" or "negative." For example, a website containing a harsh review of Bookx (e.g., where Bookx is a particular product, or company, etc.) may be assigned a "negative" score or a low overall score. Alternatively, the positive/negative determination may be integrated with the synonym/antonym feature, such that "interesting", "satisfactory" and "excellent" (to continue the example above) are considered to be positive and "boring", "unsatisfactory" and "poor" are considered to be negative. User 710 may enter input to request positive webpages (such that a webpage containing "Bookx" and "excellent" will be included in set S' but a webpage containing "Bookx" and "poor" will be excluded), negative webpages, and/or balanced webpages, e.g., webpages that contain "Bookx" and both a positive and a negative adjective based on the user's input, or webpages with text containing approximately the same number of positive adjectives as negative adjectives (e.g., 45-55% of the adjectives are positive, or 45-55% of the adjectives are negative).

All of the above options can be implemented using known input techniques such as check boxes, radio buttons, etc., and any combination of features may be enabled or disabled. The various possible inputs may be available for the user to set at any time during the guided tour process. Based on user input at block 250, an itinerary of web surfing travel is generated based on accessibility matrix ACCFINAL. For example, the diagonal cells in ACCFINAL corresponding to set S' (which is the set resulting from applying the user input at block 250 to prune the overall set S of webpages) may be sorted in descending order. The webpage in S' corresponding to the highest value diagonal cell in accessibility matrix ACCFINAL will be the first webpage (first stop) in the itinerary, the webpage corresponding to the second-highest value diagonal cell will be the second webpage in the itinerary, etc.

Referring back to FIG. 2, at block 270 the first webpage in the itinerary is visited by user 710 as a stop along the tour. For example, content of the first webpage in the itinerary may be shown at region 1000 (FIG. 10) of GUI 800. In some embodiments, the content of webpages in the itinerary is displayed to the user while maintaining the overall "look and feel" of website W (the tour website). For example, rather than simply having the web browser render and display the entire first webpage in the itinerary in the conventional manner (which would cause user 710 not to graphical "look and feel" elements of website W, various portions of that first webpage are retrieved and a new webpage (which may referred to as a host webpage) is generated that incorporates those portions. As one example implementation, a script in a programming language such as PHP may be used to retrieve various graphical components (e.g., images) and/or textual components of the first webpage in the itinerary and then generate (e.g., using "print" statements) an HTML file for the host webpage. In this way, a new webpage is generated which contains the look and feel of website W (e.g., as shown by GUI 800 in FIG. 10) and yet also includes content from the first webpage (and later the second webpage, and the third webpage, etc.) in the itinerary. In some embodiments, new host webpages are generated for each respective stop along the web tour.

GUI 800 may include a number of icons or buttons that enable user input throughout the tour of webpages. The icons and buttons are described by way of example only, and other arrangements are possible. The icons and buttons may be part of a webpage associated with webpage W and may be arranged in various ways known to a person of ordinary skill in the art.

Figure 10:
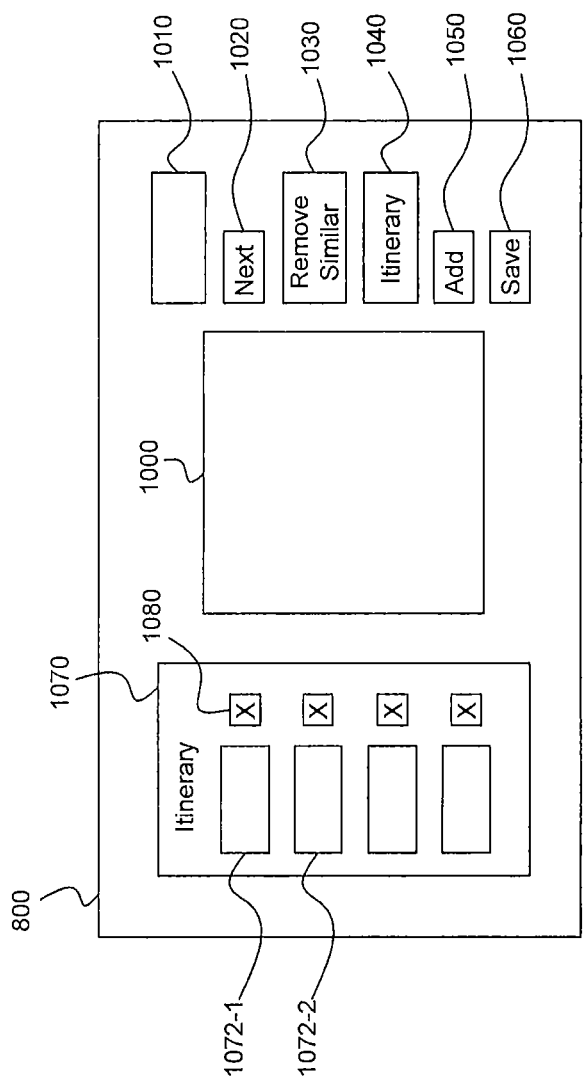
FIG. 10 is a depiction of an example GUI for a guided website tour in accordance with some embodiments.

Input field 1010 which was used to receive user inputted keywords as described above may be maintained on the display (see top right of FIG. 10). User 710 may enter keywords into input field 1010 at any time during the guided tour process, and the itinerary may be updated or re-generated accordingly, e.g., using the same technique described above for itinerary generation. A "next" button 1020 may be provided to enable the user to move to the next webpage in the itinerary. In some embodiments, "next" button 1020 does not have to be activated to proceed to the next webpage in the itinerary, and instead a timer may be used to govern advancement to the next webpage. Such functionality may be particularly convenient when the itinerary includes images, for example, so that user 710 can view the images in slideshow mode without having to press any buttons.

In some embodiments, instead of or in addition to providing "next" button 1020, a hyperlink to the next webpage in the itinerary is provided, e.g., at region 1000.

A "remove similar" button 1030 may be used to remove from the itinerary all webpages that are similar to the presently displayed webpage according to a similarity metric. Much like the adjacency matrix MADJ, a similarity matrix MSIM may be computed that compares each webpage in set S to each other webpage in set S and assigns a similarity score accordingly. Various text-based or semantic content-based similarity measures known to persons of ordinary skill in the art may be used. The similarity scores in matrix MSIM may be real numbers between 0 and 1, with rows and columns arranged to correspond to sorted webpages of set S like in the case of matrix MADJ. Thus, the value at a given cell (at a given row and column) in matrix MSIM represents how similar the webpage corresponding to the given row is to the webpage corresponding to the given column. To account for traffic flow considerations based on incoming and outgoing links, matrix MSIM may be preprocessed and then iteratively updated until convergence in the same manner as blocks 220, 230, and 240 described above regarding the accessibility matrix. The final converged similarity matrix (after the convergence criterion is satisfied at 240 for the similarity matrix) may be labeled MSIMFINAL. One webpage may be determined to be highly similar to another webpage if the cell in matrix MSIMFINAL corresponding to those two webpages has a value exceeding a predetermined threshold, for example. Based on similarity matrix MSIMFINAL, webpages that are deemed highly similar to the webpage being presently viewed at region 1010 may be pruned from the itinerary based on user input at button 830.

Alternatively, user 710 may manually prune the itinerary. For example, in some embodiments the various webpages in the itinerary (stops along the guided web tour) are displayed in the GUI, e.g., at region 1070 as entries 1072-1, 1072-2, etc. An icon 1080 such as an "X" box may be provided to enable user 710 to delete any of those entries from the itinerary. In some embodiments, an "itinerary" button 1040 may be selected to cause the itinerary to be displayed at region 1070.

Webpages may also be added to the itinerary. User 710 may activate "add" button 1050 which prompts the user to enter the URL of a webpage to be added. The added webpage may be automatically positioned at the appropriate place in the itinerary based on that webpage's diagonal cell value in accessibility matrix ACCFINAL relative to the diagonal cell values of the existing webpages in the itinerary. Alternatively, the added webpage may be placed at the end of the itinerary, e.g., if the user so requests via a suitable input.

A "save" button 1060 may be provided to enable user 710 to save the present itinerary and/or location within the itinerary so that the user can return to the itinerary or that location within the itinerary at a later time (e.g., after having visited webpages other than W in the interim).

Although the GUI buttons in FIG. 10 are described above with particular labels for convenience (such as "remove similar"), any suitable labels may be used.

Referring back to FIG. 2, if the end of the journey (last webpage in the itinerary) has not been reached, the guided tour continues to the next stop in the itinerary as shown by the loop back to block 250. Blocks 250 and 260 are optional after the first webpage in the itinerary is displayed. Thus, user 710 can experience a guided web tour with minimal user interaction needed or can provide input (such as "remove similar" or "add") after each stop in the itinerary if desired.

FIG. 9 is a diagram of a computer system 900 which may be an example implementation of computing device 720 that may be used in some embodiments. Computer system 900 may include one or more processors 902. Each processor 902 is connected to a communication infrastructure 906 (e.g., a communications bus, cross-over bar, or network). Computer system 900 may include a display interface 922 that forwards graphics, text, and other data from the communication infrastructure 906 (or from a frame buffer, not shown) for display on the display unit 924.

Computer system 900 may also include a main memory 904, such as a random access memory (RAM), and a secondary memory 908. The secondary memory 908 may include, for example, a hard disk drive (HDD) 910 and/or removable storage drive 912, which may represent a floppy disk drive, a magnetic tape drive, an optical disk drive, a memory stick, or the like as is known in the art. The removable storage drive 912 reads from and/or writes to a removable storage unit 916. Removable storage unit 916 may be a floppy disk, magnetic tape, optical disk, or the like. As will be understood, the removable storage unit 916 may include a computer readable storage medium having tangibly stored therein (embodied thereon) data and/or computer software instructions, e.g., for causing the processor(s) to perform various operations.

In alternative embodiments, secondary memory 908 may include other similar devices for allowing computer programs or other instructions to be loaded into computer system 900. Secondary memory 908 may include a removable storage unit 918 and a corresponding removable storage interface 914, which may be similar to removable storage drive 912, with its own removable storage unit 916. Examples of such removable storage units include, but are not limited to, USB or flash drives, which allow software and data to be transferred from the removable storage unit 916, 918 to computer system 900.

Computer system 900 may also include a communications interface 920. Communications interface 920 allows software and data to be transferred between computer system 400 and external devices. Examples of communications interface 920 may include a modem, Ethernet card, wireless network card, a Personal Computer Memory Card International Association (PCMCIA) slot and card, or the like. Software and data transferred via communications interface 920 may be in the form of signals, which may be electronic, electromagnetic, optical, or the like that are capable of being received by communications interface 920. These signals may be provided to communications interface 920 via a communications path (e.g., channel), which may be implemented using wire, cable, fiber optics, a telephone line, a cellular link, a radio frequency (RF) link and other communication channels.

In this document, the terms "computer program medium" and "non-transitory computer-readable storage medium" refer to media such as, but not limited to, media at removable storage drive 912, or a hard disk installed in hard disk drive 910, or removable storage unit 916. These computer program products provide software to computer system 900. Computer programs (also referred to as computer control logic) may be stored in main memory 904 and/or secondary memory 908. Computer programs may also be received via communications interface 920. Such computer programs, when executed by a processor, enable the computer system 900 to perform the features of the methods discussed herein. For example, main memory 904, secondary memory 908, or removable storage units 916 or 918 may be encoded with computer program code (instructions) for performing operations corresponding to various processes disclosed herein.

Figure 11:
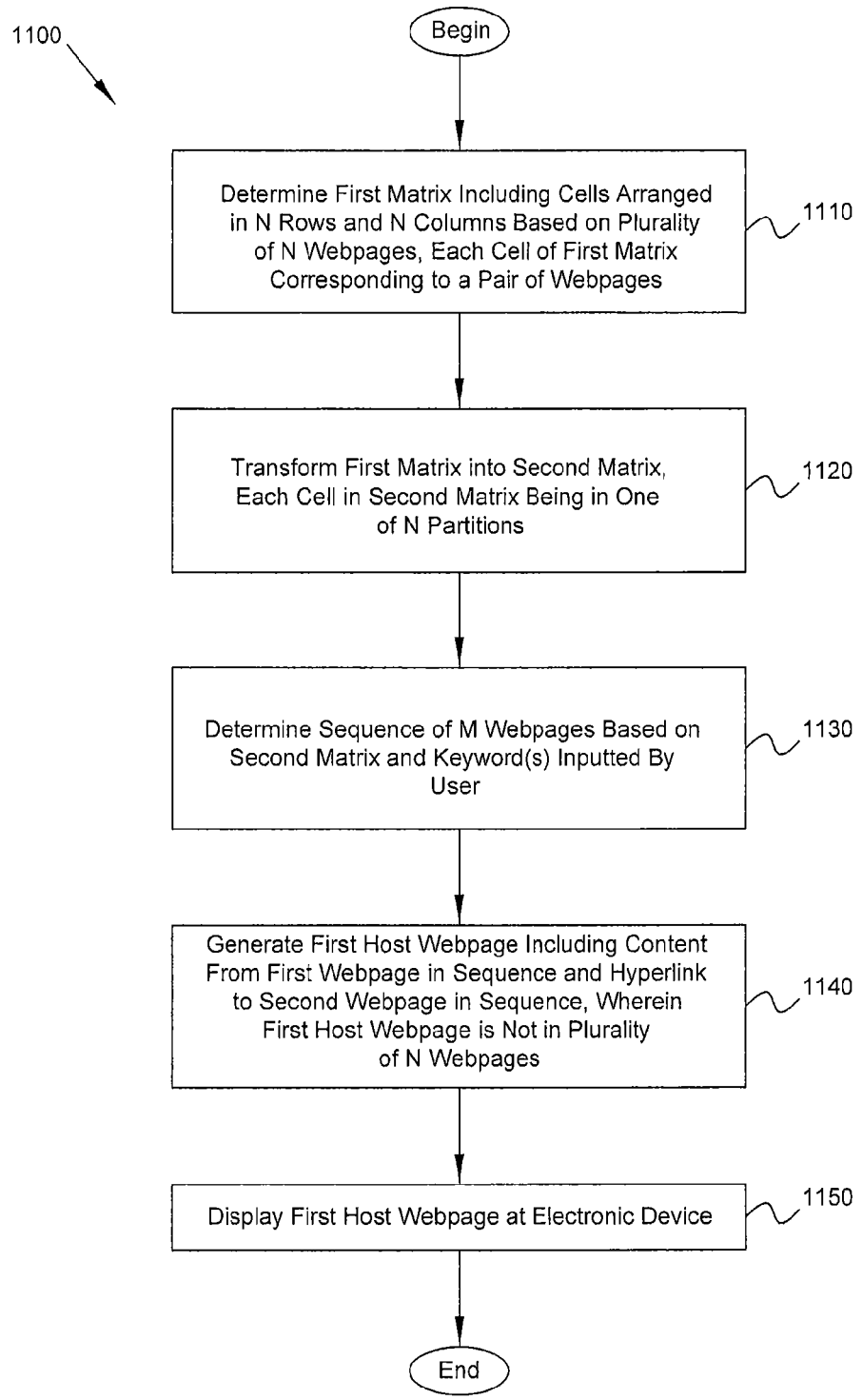
FIG. 11 is a flow diagram of a process for guided website navigation in accordance with some embodiments.

FIG. 11 is a flow diagram of a process 1100 for guided website navigation in accordance with some embodiments. Using a processor of an electronic device, a first matrix is determined (block 1110) that includes cells arranged in N rows and N columns based on a plurality of N webpages (where N is an integer). Each cell of the first matrix corresponds to a pair of webpages among the plurality of webpages. Using the processor, the first matrix is transformed (block 1120) into a second matrix including cells arranged in N rows and N columns. Each cell of the second matrix is in one of N partitions, wherein the values of the cells within each partition are substantially equal to one another, e.g., within a predetermined tolerance. Using the processor, a sequence of M webpages is determined (block 1130) based on the second matrix and one or more keywords inputted by a user. The sequence is arranged in order from a first webpage to an $M^{th}$ webpage (where M is an integer less than N), and each of the webpages in the sequence is in the plurality of N webpages. Using the processor, a first host webpage is generated (block 1140) including content from the first webpage in the sequence and a hyperlink to a second webpage in the sequence. The first host webpage is not in the plurality of N webpages, and the second webpage in the sequence succeeds the first webpage in the sequence. The first host webpage is displayed (block 1150) at the electronic device.

Figure 12:
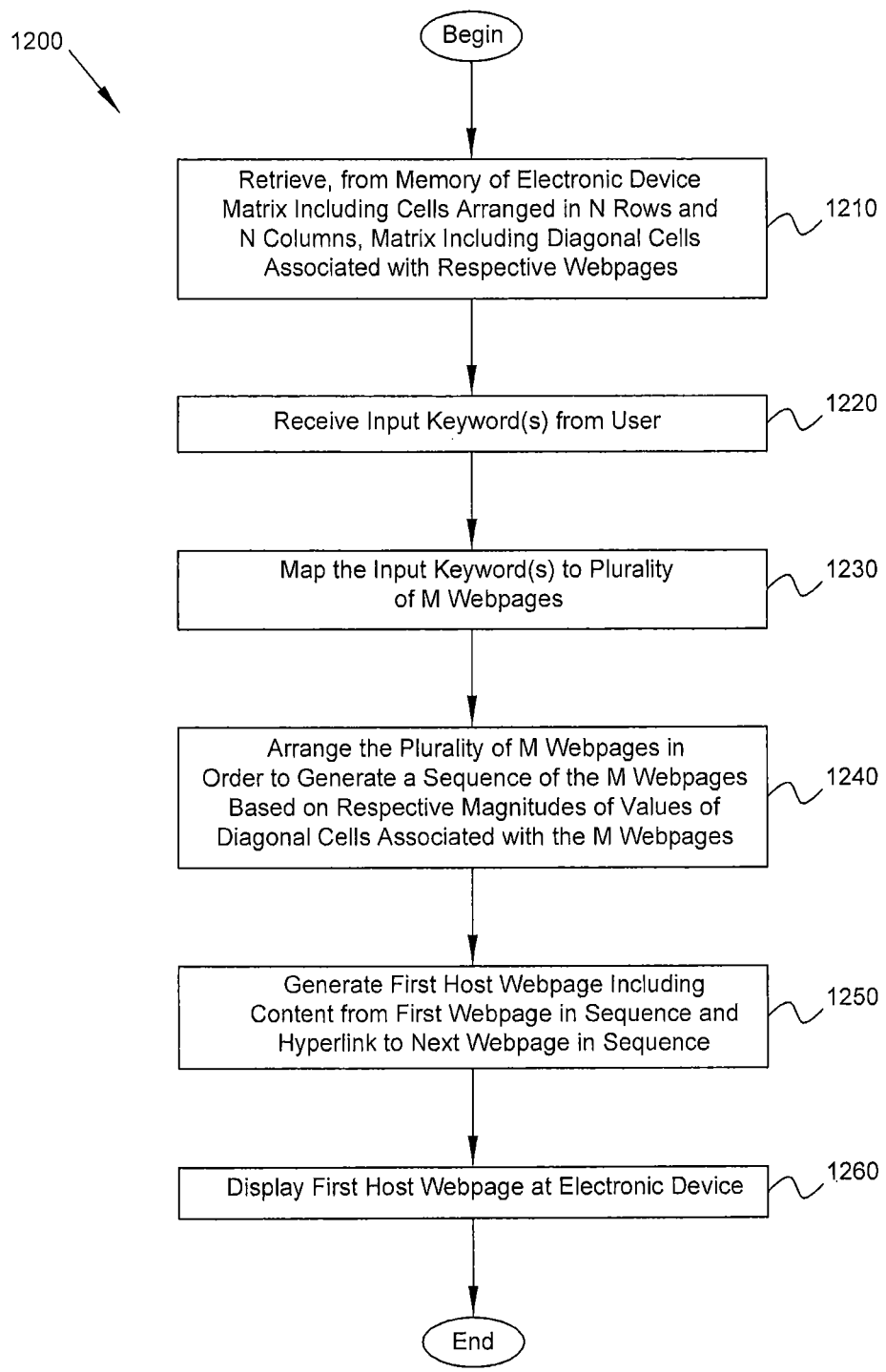
FIG. 12 is a flow diagram of a process for guided website navigation in accordance with some embodiments.

FIG. 12 is a flow diagram of a process 1200 for guided website navigation in accordance with some embodiments. A matrix including cells arranged in N rows and N columns is retrieved (block 1210) from a memory of an electronic device. The matrix includes diagonal cells associated with respective webpages. One or more input keywords is/are received from a user (block 1220). Using a processor of the electronic device, the one or more input keywords is/are mapped (block 1230) to a plurality of M webpages, where M is an integer. Using the processor, the plurality of M webpages are arranged in order (block 1240) to generate a sequence of the M webpages. The sequence is arranged from a first webpage to an $M^{th}$ webpage based on respective magnitudes of the values of the diagonal cells associated with the M webpages. Using the processor, a first host webpage is generated (block 1250) including content from the first webpage in the sequence and a hyperlink to a next webpage in the sequence. The first host webpage is displayed (block 1260) at the electronic device.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A method for guided web site navigation, the method comprising:

using a processor of an electronic device, determining a first matrix including cells arranged in N rows and N columns based on a plurality of N webpages, N being an integer, each cell of the first matrix corresponding to a pair of webpages among the plurality of webpages;

using the processor, transforming the first matrix into a second matrix including cells arranged in N rows and N columns, each cell of the second matrix being in one of N partitions, wherein the values of the cells within each partition are within a predetermined distance to one another and each partition includes N cells of the second matrix corresponding to ceiling(N/2) or ceiling (N/2)+1 rows and ceiling(N/2) or ceiling(N/2)+1 columns, and further wherein transforming the first matrix into the second matrix includes:

determining a plurality of N paths, each path being an ordered list of N cells of the first matrix, wherein for each path, each cell in said path differs from each adjacent cell in said path by a row index of 1 or N−1, and the paths are mutually disjoint; and updating each cell of the first matrix, wherein the updated value of each cell of the first matrix is equal to a dot product of:

the partition of the first matrix containing said cell, regarded as a vector, and the path containing said cell;

using the processor, determining a sequence of M webpages based on the second matrix and one or more keywords inputted by a user, the sequence arranged in order from a first webpage to an $M^{th}$ webpage, wherein M is an integer less than N and each of the webpages in the sequence is in the plurality of N webpages;

using the processor, generating a first host webpage including content from the first webpage in the sequence and a hyperlink to a second webpage in the sequence, wherein the first host webpage is not in the plurality of N webpages and the second webpage in the sequence succeeds the first webpage in the sequence; and displaying the first host webpage at the electronic device.

2. The method of claim 1, further comprising:

receiving a user input requesting the second webpage in the sequence;

using the processor, generating a second host webpage including content from the second webpage in the sequence and a hyperlink to a third webpage in the sequence, wherein the second host webpage is not in the plurality of N webpages and third webpage in the sequence succeeds the second webpage in the sequence; and displaying the second host webpage at the electronic device.

3. The method of claim 1, further comprising:

determining an adjacency matrix including cells arranged in N rows and N columns based on the plurality of N webpages, each cell of the adjacency matrix corresponding to a pair of webpages among the plurality of webpages and having a value representing whether a first webpage in said pair of webpages including a hyperlink to a second webpage in said pair of webpages;

wherein the first matrix is determined based on the adjacency matrix.

4. The method of claim 3, wherein each row of the adjacency matrix is associated with one of the plurality of N webpages, each column of the adjacency matrix is associated with one of the plurality of N webpages, and the rows and columns of the adjacency matrix are sorted by ascending order of the number of outgoing hyperlinks in the respective webpages.

5. The method of claim 1, wherein diagonal cells of the second matrix are associated with respective ones of the plurality of N webpages, and the sequence of M webpages is arranged in order based on respective magnitudes of the values of the diagonal cells associated with the M webpages.

6. The method of claim 1, wherein said updating is performed repetitively until a convergence criterion is satisfied for each partition, to yield the second matrix.

7. The method of claim 1, further comprising:

receiving a user input; and based on the received user input, removing from the sequence any webpages having more than a threshold number of outgoing hyperlinks or removing from the sequence any webpages having fewer than the threshold number of outgoing hyperlinks.

8. The method of claim 7, wherein the threshold number of outgoing hyperlinks is equal to the average number of outgoing hyperlinks for the plurality of N webpages.

9. The method of claim 1, further comprising:

receiving a user input; and based on the received user input, removing from the sequence any webpages satisfying a predetermined similarity criterion with respect to one of the webpages in the sequence.

10. The method of claim 1, further comprising:

determining, based on at least one of the inputted keywords, a sentiment score for at least one webpage in the plurality of N webpages;

receiving a user input; and based on the received user input, removing from the sequence at least one webpage for which the sentiment score satisfies a predetermined condition.

11. A method for guided website navigation, the method comprising:

retrieving, from a memory of an electronic device, a matrix including cells arranged in N rows and N columns, the matrix including diagonal cells associated with respective webpages;

receiving, from a user, one or more input keywords;

using a processor of the electronic device, mapping the one or more input keywords to a plurality of M webpages, M being an integer;

using the processor, arranging the plurality of M webpages in order to generate a sequence of the M webpages, the sequence arranged from a first webpage to an $M^{th}$ webpage based on respective magnitudes of the values of the diagonal cells associated with the M webpages;

receiving, from the user, an input;

based on the received input, removing from the sequence any webpages having more than a threshold number of outgoing hyperlinks or removing from the sequence any webpages having fewer than the threshold number of outgoing hyperlinks;

using the processor, generating a first host webpage including content from the first webpage in the sequence and a hyperlink to a next webpage in the sequence; and displaying the first host webpage at the electronic device.

12. The method of claim 11, further comprising:

receiving, from the user, an input requesting the second webpage in the sequence;

using the processor, generating a second host webpage including content from the second webpage in the sequence and a hyperlink to a third webpage in the sequence, wherein the second host webpage is not in the plurality of N webpages and the third webpage in the sequence succeeds the second webpage in the sequence; and displaying the second host webpage at the electronic device.

13. The method of claim 11, wherein the matrix includes N partitions, each partition of the matrix including N cells of the matrix corresponding to ceiling(N/2) or ceiling(N/2)+1 rows and ceiling(N/2) or ceiling(N/2)+1 columns.

14. The method of claim 11, further comprising:

receiving, from the user, an input; and based on the received input, removing from the sequence any webpages satisfying a predetermined similarity criterion with respect to one of the webpages in the sequence.

15. The method of claim 11, further comprising:

determining, based on at least one of the input keywords, a sentiment score for at least one webpage in the plurality of M webpages;

receiving a user input; and based on the received user input, removing from the sequence at least on webpage for which the sentiment score satisfies a predetermined condition.

16. A method for guided website navigation, the method comprising:

using a processor of an electronic device, determining a first matrix including cells arranged in N rows and N columns based on a plurality of N webpages, N being an integer, each cell of the first matrix corresponding to a pair of webpages among the plurality of webpages;

using the processor, transforming the first matrix into a second matrix including cells arranged in N rows and N columns, each cell of the second matrix being in one of N partitions, wherein the values of the cells within each partition are within a predetermined distance to one another;

using the processor, determining a sequence of M webpages based on the second matrix and one or more keywords inputted by a user, the sequence arranged in order from a first webpage to an $M^{th}$ webpage, wherein M is an integer less than N and each of the webpages in the sequence is in the plurality of N webpages;

receiving a user input;

based on the received user input, removing from the sequence any webpages having more than a threshold number of outgoing hyperlinks or removing from the sequence any webpages having fewer than the threshold number of outgoing hyperlinks;

using the processor, generating a first host webpage including content from the first webpage in the sequence and a hyperlink to a second webpage in the sequence, wherein the first host webpage is not in the plurality of N webpages and the second webpage in the sequence succeeds the first webpage in the sequence; and displaying the first host webpage at the electronic device.

17. A method for guided website navigation, the method comprising:

using a processor of an electronic device, determining a first matrix including cells arranged in N rows and N columns based on a plurality of N webpages, N being an integer, each cell of the first matrix corresponding to a pair of webpages among the plurality of webpages;

using the processor, transforming the first matrix into a second matrix including cells arranged in N rows and N columns, each cell of the second matrix being in one of N partitions, wherein the values of the cells within each partition are within a predetermined distance to one another;

using the processor, determining a sequence of M webpages based on the second matrix and one or more keywords inputted by a user, the sequence arranged in order from a first webpage to an $M^{th}$ webpage, wherein M is an integer less than N and each of the webpages in the sequence is in the plurality of N webpages;

receiving a user input;

based on the received user input, removing from the sequence any webpages satisfying a predetermined similarity criterion with respect to one of the webpages in the sequence;

using the processor, generating a first host webpage including content from the first webpage in the sequence and a hyperlink to a second webpage in the sequence, wherein the first host webpage is not in the plurality of N webpages and the second webpage in the sequence succeeds the first webpage in the sequence; and displaying the first host webpage at the electronic device.

18. A method for guided web site navigation, the method comprising:

retrieving, from a memory of an electronic device, a matrix including cells arranged in N rows and N columns, the matrix including diagonal cells associated with respective webpages;

receiving, from a user, one or more input keywords;

using a processor of the electronic device, mapping the one or more input keywords to a plurality of M webpages, M being an integer;

using the processor, arranging the plurality of M webpages in order to generate a sequence of the M webpages, the sequence arranged from a first webpage to an $M^{th}$ webpage based on respective magnitudes of the values of the diagonal cells associated with the M webpages;

receiving, from the user, an input;
based on the received input, removing from the sequence any webpages satisfying a predetermined similarity criterion with respect to one of the webpages in the sequence;
using the processor, generating a first host webpage including content from the first webpage in the sequence and a hyperlink to a next webpage in the sequence; and
displaying the first host webpage at the electronic device.

* * * * *